June 7, 1927.
C. P. EISENHAUER
1,631,406
VALVE
Filed Nov. 23, 1925
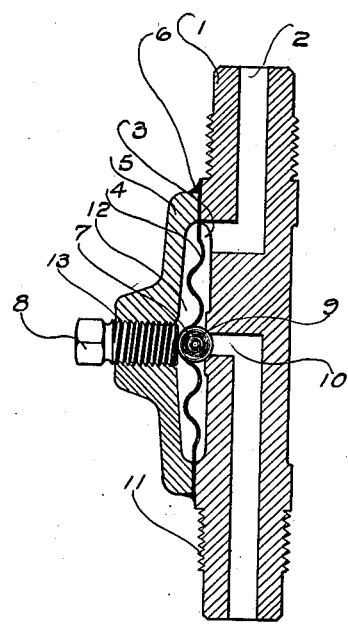
INVENTOR
Charles P. Eisenhauer,
BY Toulmin & Toulmin,
ATTORNEYS.

Patented June 7, 1927.

1,631,406

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

VALVE.

Application filed November 23, 1925. Serial No. 70,836.

My invention relates to valves.

It is the object of my invention to provide a gas-tight valve, which will permit the passage of gases through a given passageway without escape through the actuating means for the valve.

It is a further object to provide means of actuating the valve without permitting the escape of the gases controlled thereby.

Referring to the drawings:

The figure is a section through a gas line and the valve mechanism.

Referring to the drawings in detail, 1 is a tubular member having a passageway therethrough designated 2, which communicates with a pipe line for the gas which is to be conveyed through the valve. This passageway 2 communicates with a valve chamber 3 beneath a corrugated diaphragm 4 which is held between the top of the valve body 1 and the cap 5, the cap either being threaded on the valve member 1 or welded thereto at 6. This diaphragm carries centrally thereof a ball 7 directly beneath an actuating screw 8 carried in the cap 5. This ball is seated upon a valve seat 9 in the bottom of the chamber 3 and at the top of the passageway 10 which communicates with the other side of the line in which the valve is interposed. Pipes are joined by sleeves on the threaded portion 11 of the valve body 1.

It will be observed that the gases may pass through the passageways 2 and 10, depending upon the position of the ball 7. This ball can be either relieved so that the gas may pass beneath the ball 7 allowing it to go through the passageway 10 and chamber 3 into the passageway 2, or the ball may be seated by the screw 8. In either event, the metal diaphragm 4 prevents the escape of gas into the upper chamber 12 above the diaphragm 4.

Thus, it is possible to have a valve in which the gases cannot escape no matter whether the valve is open or closed, and a valve in which it is not necessary to take any precautions as to leakage of the gases around the screw or actuating member 13.

It will be understood that I desire to comprehend within my invention such modifications as may be necessary to adapt it to varying conditions and uses.

Having thus fully described my invention, what I claim as new and desire to secure by Letters Patent, is:

1. In a valve, a valve body having a passageway therethrough, a valve member adapted to control said passageway, a diaphragm associated with said valve member and said passageway interposed between the valve member and its actuating means, and an actuating means for said valve member, separable from said diaphragm and valve member said diaphragm being corrugated, said valve member being located in and positioned by one of the corrugations of said diaphragm.

2. In a valve, a valve body having a passageway therethrough, a valve member adapted to control said passageway, a diaphragm associated with said valve member and said passageway interposed between the valve member and its actuating means, and an actuating means for said valve member, separable from said diaphragm and valve member said diaphragm being corrugated, said valve member consisting of a ball seated in one of said corrugations, and adapted to be seated on its other side in a valve seat in said passageway.

In testimony whereof, I affix my signature.

CHARLES P. EISENHAUER,